United States Patent
Xu et al.

[19]

[11] Patent Number: 6,129,257
[45] Date of Patent: Oct. 10, 2000

[54] HIGH TEMPERATURE BRAZING FIXTURE

[75] Inventors: Raymond Ruiwen Xu, Carmel; Stephen N. Hammond, Brownsburg; Richard P. Chesnes, Zionsville, all of Ind.

[73] Assignee: Allison Engine Company, Inc., Indianapolis, Ind.

[21] Appl. No.: 09/452,243

[22] Filed: Dec. 1, 1999

[51] Int. Cl.$^7$ .............................. B23K 1/14; B23K 37/04; B21D 39/02; B21K 25/00; B23P 15/02
[52] U.S. Cl. ...................... 228/44.3; 228/49.1; 228/144; 432/253; 29/889.21
[58] Field of Search .............................. 228/9, 44.3, 49.1, 228/144, 149, 150; 29/889–889.722; 432/253

[56] References Cited

U.S. PATENT DOCUMENTS

| | | |
|---|---|---|
| 3,412,917 | 11/1968 | Omley . |
| 3,612,387 | 10/1971 | Rathbun ..................................... 228/6 |
| 3,707,750 | 1/1973 | Klass .................... 29/156.8 B |
| 3,965,963 | 6/1976 | Phipps et al. ............................ 164/60 |
| 3,995,805 | 12/1976 | Gersbacher . |
| 4,042,162 | 8/1977 | Meginnis et al. ...................... 228/106 |
| 4,087,456 | 5/1978 | Schier et al. ............................ 228/106 |
| 4,089,456 | 5/1978 | Toppen et al. ........................... 228/195 |
| 4,576,575 | 3/1986 | Jones ....................................... 432/253 |
| 4,648,921 | 3/1987 | Nutter, Jr. ................................ 156/77 |
| 4,688,652 | 8/1987 | Crist . |
| 4,722,469 | 2/1988 | Rydstad et al. . |
| 4,750,946 | 6/1988 | Jahnke et al. . |
| 4,817,858 | 4/1989 | Verpoort . |
| 4,882,823 | 11/1989 | Weisert et al. .............................. 29/6.1 |
| 4,987,944 | 1/1991 | Parks ......................................... 164/10 |
| 5,013,014 | 5/1991 | Mushardt ................................... 269/7 |
| 5,020,716 | 6/1991 | Miller et al. . |
| 5,063,662 | 11/1991 | Porter et al. ......................... 29/889.72 |
| 5,099,573 | 3/1992 | Krauss et al. .......................... 29/889.2 |
| 5,118,026 | 6/1992 | Stacher .................................... 228/157 |
| 5,176,499 | 1/1993 | Damlis et al. ........................ 416/97 R |
| 5,277,052 | 1/1994 | Braunheim et al. ...................... 72/414 |
| 5,285,573 | 2/1994 | LeMonds et al. ................... 29/889.72 |
| 5,490,322 | 2/1996 | Goodwater et al. ...................... 29/722 |
| 5,510,080 | 4/1996 | Nishi et al. .............................. 420/451 |
| 5,755,031 | 5/1998 | Baumgarten et al. ................. 29/889.1 |
| 5,960,249 | 9/1999 | Ritter et al. ................................ 419/6 |

*Primary Examiner*—Patrick Ryan
*Assistant Examiner*—Kiley Stoner
*Attorney, Agent, or Firm*—Woodard, Emhardt, Naughton, Moriarty & McNett

[57] ABSTRACT

The present invention provides a brazing fixture and method of using the fixture which allows the brazing of a joint in an oxide-dispersion-strengthened (ODS) high temperature alloy workpiece where stresses in the workpiece operate to open the joint during the brazing process. The fixture is formed from the same ODS alloy as the workpiece, such that the fixture exhibits the same coefficient of thermal expansion as the workpiece. This allows maximization of surface area contact between the fixture and the workpiece during the brazing operation in order to force the workpiece to maintain its design dimensions and to prevent the joint from opening. The fixture includes a cavity preventing fixture/workpiece contact in the area of the braze to help control thermal lag in the area of the joint.

8 Claims, 4 Drawing Sheets

HIGH TEMPERATURE BRAZING FIXTURE

The U.S. Government has a paid-up license in this invention and the right in limited circumstances to require the patent owner to license others on reasonable terms as provided by the terms of Contract No. N00019-94-C-0255 awarded by the Navy.

TECHNICAL FIELD OF THE INVENTION

The present invention generally relates to joining two pieces of metal and, more particularly, to a high temperature brazing fixture.

BACKGROUND OF THE INVENTION

Oxide-dispersion-strengthened (ODS) high temperature alloys offer combinations of high-temperature strength, oxidation resistance, and hot corrosion resistance that can not be obtained from other alloys. For example, a nickel-based alloy with yttrium oxide dispersoids, INCONEL alloy MA 754 has been considered as one of the ODS alloys with greater potential in the next generation advanced gas-turbine hot section components such as turbine vanes and combustor liners. In such applications, the ODS alloys are typically used to form LAMILLOY sheets. As is known in the art, LAMILLOY is a multilayered porous material designed for cooled airframe and propulsion system components. It features a labyrinth of holes and passages in a laminated assembly. LAMILLOY is produced by photochemical machining an array of pedestals and holes in two or more layers of sheet material and subsequently diffusion bonding the layers into the laminated sheet configuration.

Many applications require that ODS alloys be joined to either themselves or to other materials. Because welding processes utilize melting of the base material, they are unsuitable for use with the porous LAMILLOY material due to destruction of the porous structure at the weld area. Furthermore, MA 754 cannot be successfully joined by a fusion (arc) welding process while retaining any significant percentage of the alloy's stress rupture strength. Fusion welding causes dispersoid agglomeration and the development of weld solidification grain boundaries transverse to the rolling direction of the material. This results in a loss of high-temperature strength and oxidation resistance.

The joining of two LAMILLOY sheets is therefore accomplished by brazing, which is performed at a temperature below the melting point of the base material. The brazing process requires a lap joint (overlapping ends of the material to be brazed) instead of the butt joint normally used in welding. An example of an application where it is desirable to join two LAMILLOY sheets together by means of brazing is in the formation of vanes 10 for use in a turbine engine, as illustrated in FIGS. 1–4. After forming the material into the vane 10 required shape (design dimensions), the trailing edge 12 must be brazed in order to constrain this region to the design dimensions.

The technical challenges involved in brazing the trailing edges 12 of the MA 754 LAMILLOY vanes 10 include the high residual stress in the LAMILLOY, the very complex contour of the vanes 10, the extremely thin dimension (0.002 to 0.004" thick) of the LAMILLOY cover sheets at the braze joints, and the LAMILLOY holes adjacent to the joints.

The high residual stress is generated during the LAMILLOY vane forming operations. This residual stress creates a large force on the tailing edge joint 12 that results in forcing the joint open during the braze operation. The brazing is accomplished by placing a braze material foil into the gap in the trailing edge 12, using laser tack welds to hold the two halves of the gap together until the brazing is complete. The brazing is then performed at a temperature of approximately 2300° F. As indicated in FIG. 3 by the arrows 14, the maximum gap in the trailing edge 12 joint in the area of the braze is desired to be 0.002–0.004 inch maximum.

The trial brazing of a test vane indicated that laser tack welds used in brazing MA 754 sheets were not strong enough to maintain the braze joint gap of 0.002 to 0.004 inch. Some of the laser tack welds broke during the brazing thermal cycle. Metallographic evaluation showed the actual maximum gap 14 in the braze joint was as wide as 0.020 inch. Wide gap brazing (0.08–0.020 inch) often requires multi-brazing (re-brazing) thermal cycles and application of more braze filler metal, which causes more braze erosion of MA 754 base material. Additionally, more braze filler metal applied for wide gap brazing makes it difficult to prevent excessive braze material from flowing into the LAMILLOY holes and passages at the joint 12. This is because holes in the surface of the LAMILLOY material are within 0.010 inch from the braze area.

Additionally, the LAMILLOY cover sheets at the braze joints are extremely thin (0.002 to 0.004" thick), therefore the brazing process window (brazing temperature and time) is very narrow. It is very crucial to precisely control the brazing temperature and time, otherwise the braze filler metal could completely erode the thin LAMILLOY cover sheet and flow into LAMILLOY cooling channels. This will ruin the LAMILLOY components. Conversely, strong braze joints will not be achieved with insufficient brazing temperature and time. This is illustrated in FIG. 4, which is a cross-sectional end view of the braze joint area 12, showing the braze material 16 and the LAMILLOY holes 18. The dimension 20 shows that the holes 18 are generally only 0.002 to 0.004 inches from the braze material 16. Even though the braze temperature is approximately 200° F. lower than the LAMILLOY melting temperature, the base metal can still erode (dissolve) in the very thin region. Such interalloying can reduce the base metal thickness until the braze material is allowed to run into the holes 18.

There is therefore a need for a means for brazing a joint in an oxide-dispersion-strengthened (ODS) high temperature alloy workpiece where stresses in the workpiece operate to open the joint during the brazing process. Furthermore, such means for brazing must allow the required brazing time and temperature profile to be maintained in order to minimize erosion of the base metal. The present invention is directed toward meeting this need.

SUMMARY OF THE INVENTION

The present invention provides a brazing fixture and method of using the fixture which allows the brazing of a joint in an oxide-dispersion-strengthened (ODS) high temperature alloy workpiece where stresses in the workpiece operate to open the joint during the brazing process. The fixture is formed from the same ODS alloy as the workpiece, such that the fixture exhibits the same coefficient of thermal expansion as the workpiece. This allows maximization of surface area contact between the fixture and the workpiece during the brazing operation in order to force the workpiece to maintain its design dimensions and to prevent the joint from opening. The fixture includes a cavity preventing fixture/workpiece contact in the area of the braze to help control thermal lag in the area of the joint.

DETAILED DESCRIPTION OF THE PREFERRED EMBODIMENTS

Figure 1:
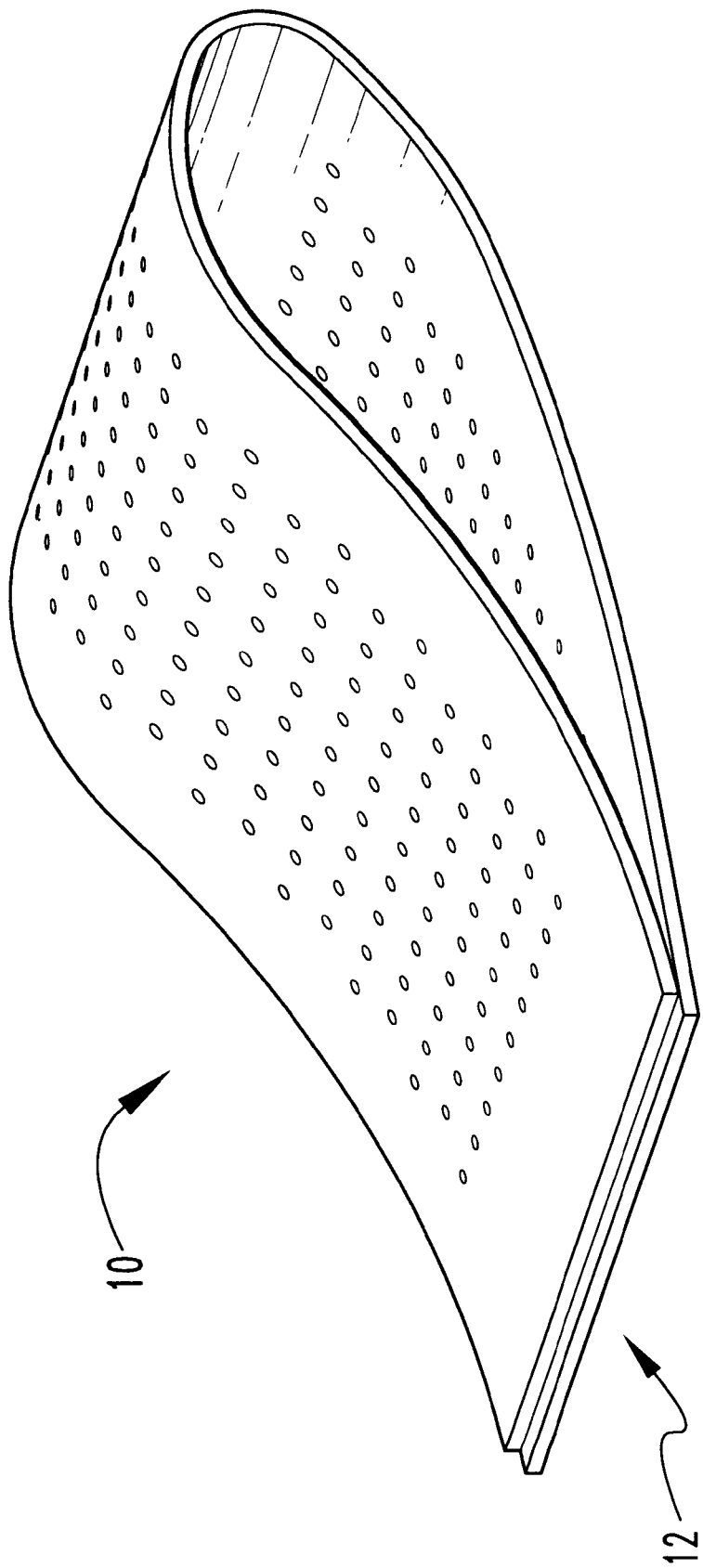
FIG. 1 is a perspective view of a turbine vane illustrating a joint to be brazed.
Figure 2:
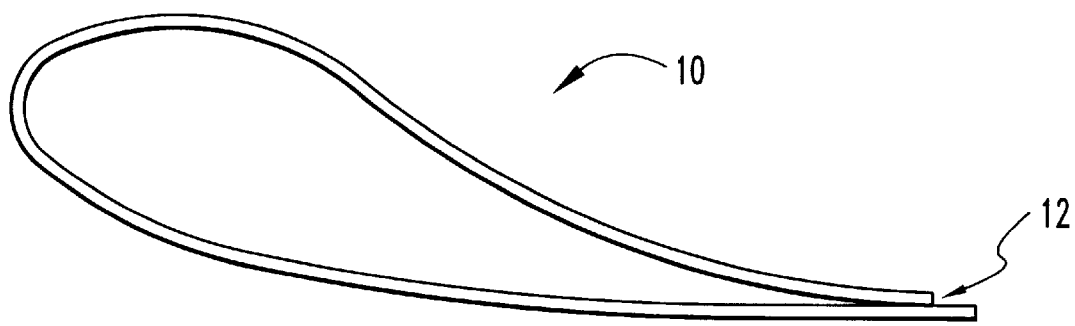
FIG. 2 is a side cross-sectional view of the vane of FIG. 1.
Figure 3:
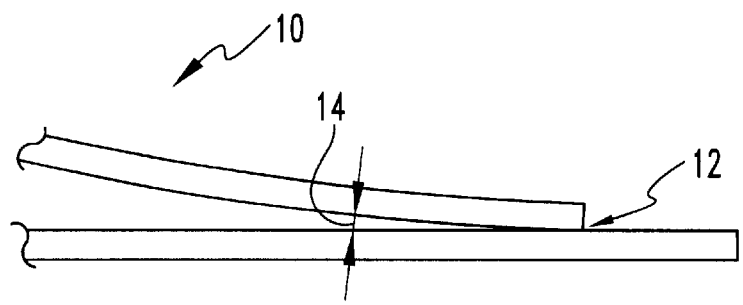
FIG. 3 is a detailed view of the vane joint of FIG. 2.
Figure 4:
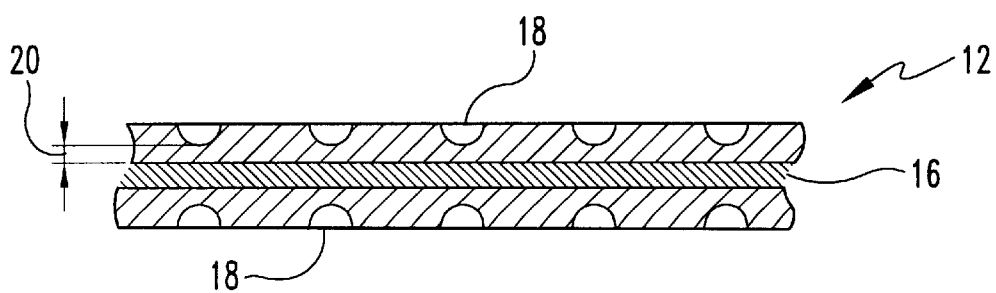
FIG. 4 is a cross-sectional end view of the joint of the vane of FIG. 2.
Figure 5:
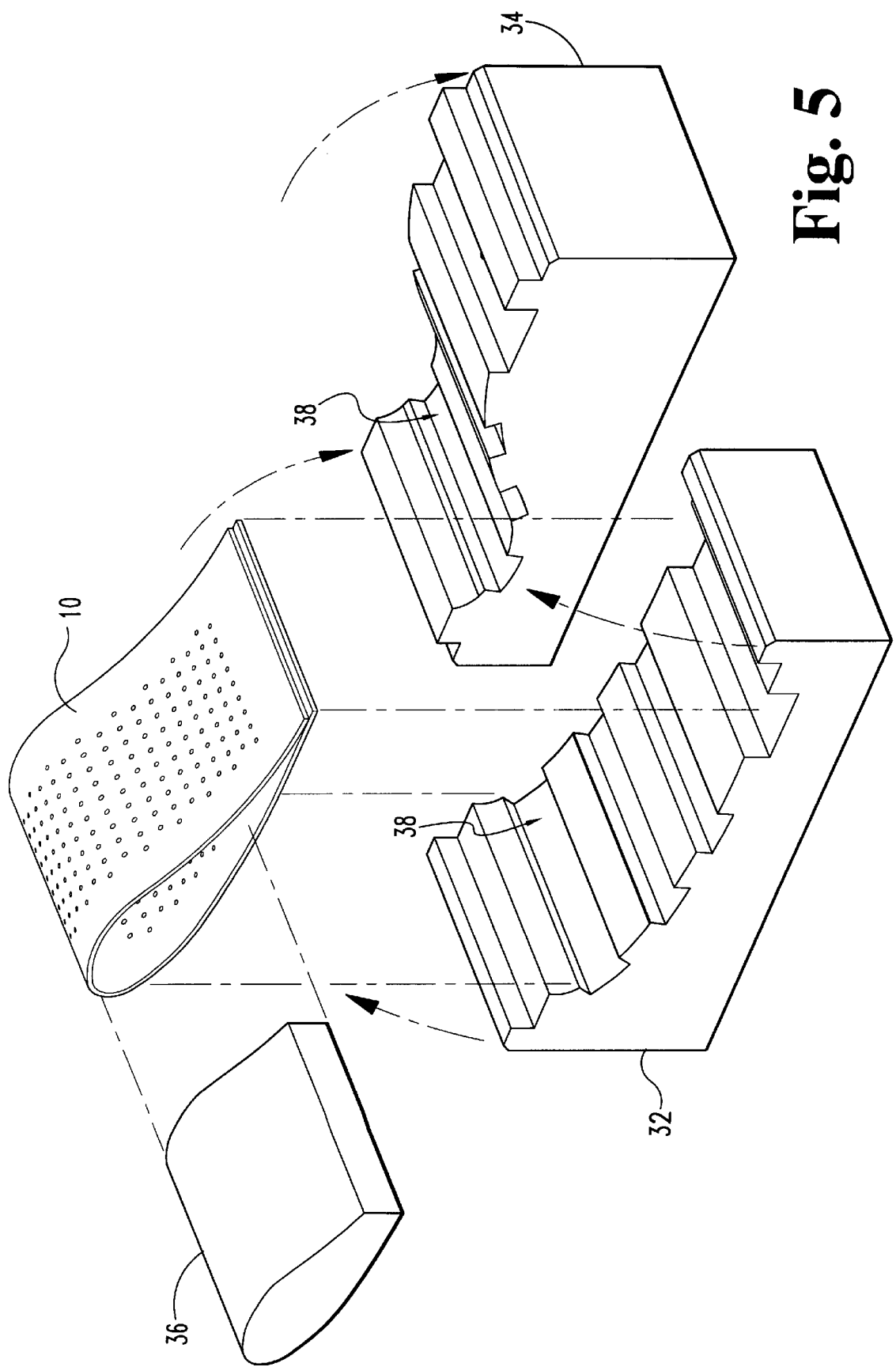
FIG. 5 is a perspective view of the vane of FIG. 1 and the fixture of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

One solution to constrain the joint of the workpiece to prevent opening during brazing is to provide a brazing fixture that physically holds the joint together. Due to the high temperatures used during the brazing process, the material chosen for the fixture must be capable of withstanding these temperatures. Also, due to the LAMILLOY vane 10 residual stresses, the fixture material must also demonstrate appropriate mechanical strength at the high temperature. Conventional tooling materials, such as stainless steels and HA 230 Ni-based superalloy do not possess such high temperature mechanical properties.

Special high temperature tooling materials do exist, such as materials made of molybdenum, tungsten and various ceramics; however, these materials have a much lower coefficient of thermal expansion than ODS alloy from which the vane 10 is constructed. A fixture made from one of these materials would cause over-constraining of the vane 10 during the brazing thermal cycle. Additionally, these materials are very difficult to fabricate.

Figure 6:
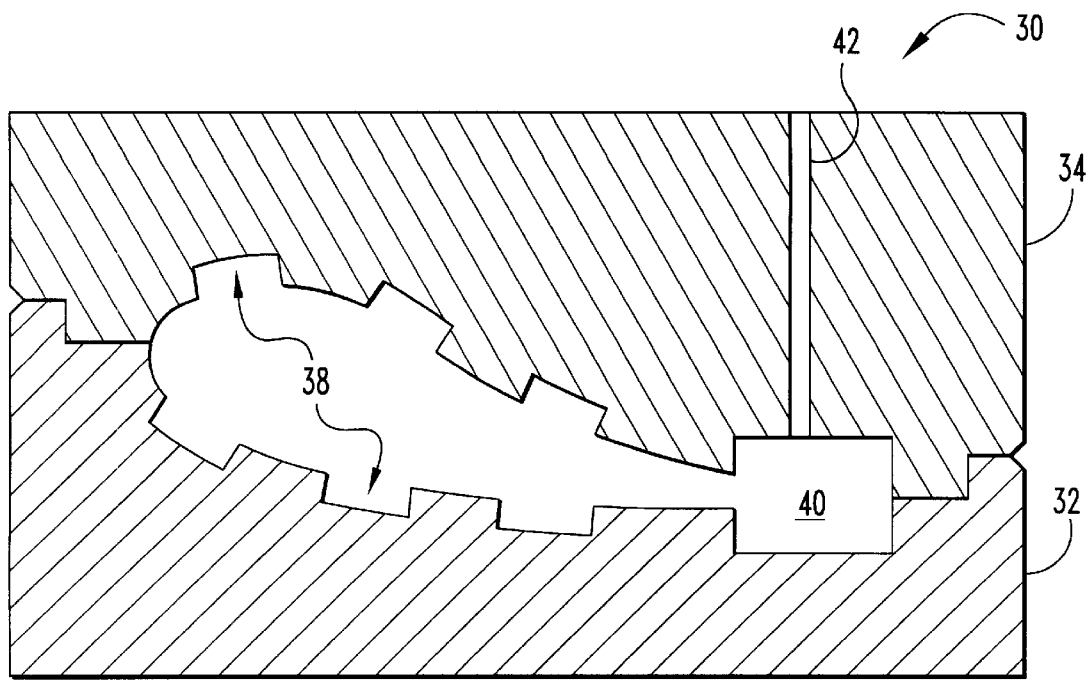
FIG. 6 is a side cross-sectional view of the fixture of the present invention.
Figure 7:
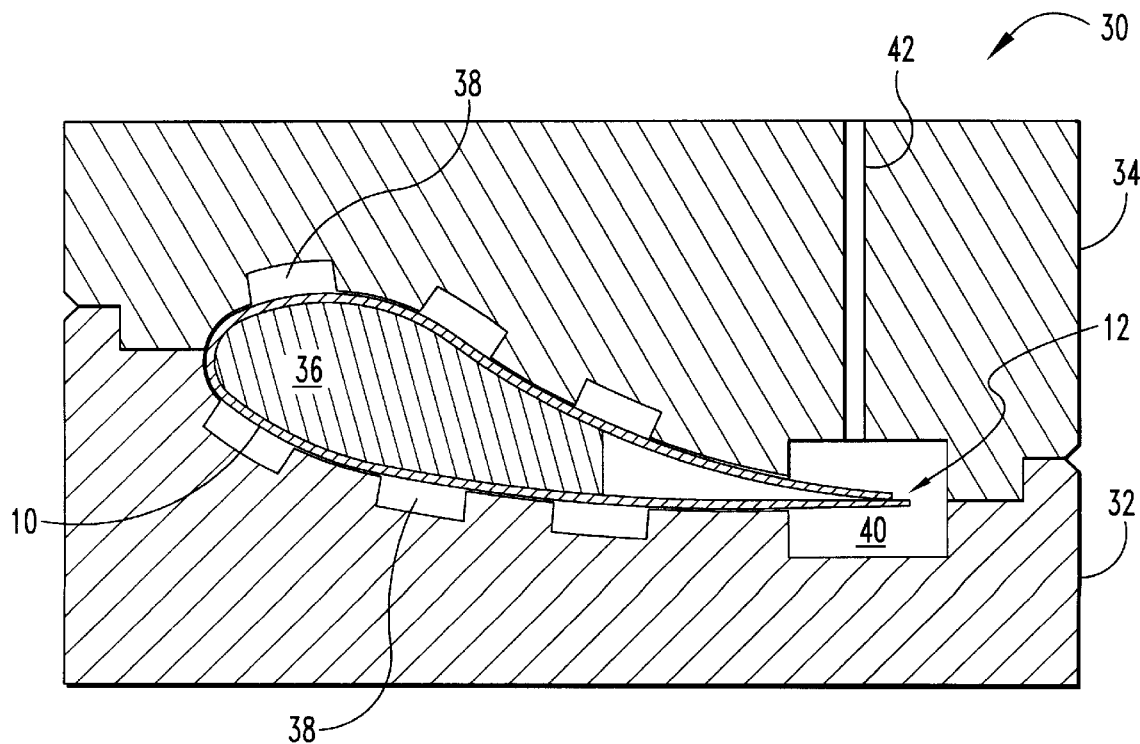
FIG. 7 is a side cross-sectional view of the fixture of the present invention with a turbine vane mounted therein.

The problem is therefore to design a brazing fixture that is able to maximize contact between the vane 10 and the fixture (in order to ensure that the vane 10 retains its design dimensions throughout the brazing thermal cycle), while at the same time preventing over-constrainment of the vane 10. The present inventors have solved this problem by use of the fixture illustrated in FIGS. 6–8 and indicated generally at 30. The fixture 30 is machined from the same ODS alloy at the material from which the vane 10 is constructed, thereby providing an exact match between the coefficients of thermal expansion of the vane 10 and the fixture 30.

The fixture 30 comprises a bottom section 32, a top section 34, and a center section 36. The bottom section 32 and top section 34 each have a surface configuration that substantially exactly mirrors the surface design dimensions of the finished vane 10. In order to minimize the thermal lag created by the fixture 30, which acts as a heat sink, a series of channels 38 are formed in the bottom section 32 and the top section 34 in order to balance contact with the vane 10 and reduction of thermal lag. The center section 36 is shaped to partially fill the space within the vane 10 and to closely mirror the vane 10 contours in that space.

The fixture 30 bottom section 32 and top section 34 are preferably held in alignment by means of pins (not shown) which allow the two halves to move independently in the vertical direction. The fixture halves are therefore held together solely by weight (additional weights may be placed on top of top section 34 during use).

A brazing cavity 40 is formed by the top section 34 and the bottom section 32 in the area around the joint 12 to be brazed. This ensures that the fixture 30 does not contact the braze joint 12 so that the thermal profile of the braze joint 12 may be more accurately controlled during the brazing operation. In order to monitor the braze joint 12 temperature during the brazing operation, a thermocouple (not shown) may be introduced to the joint 12 through a thermocouple passageway 42 formed in the top section 34.

The fixture 30 of the present invention therefore provides a means for effectively constraining an ODS alloy workpiece, such as a vane 10, during a high temperature brazing operation in order to prevent a joint in the workpiece from opening up during the thermal cycle. The interior surface of the fixture 30 is designed to mirror the contours of the workpiece in order to more effectively constrain the workpiece to its design dimensions over the brazing temperature cycle. By forming the fixture 30 solely from the same ODS alloy from which the workpiece is formed, the thermal expansion characteristics of the fixture 30 match the thermal expansion characteristics of the workpiece over the entire brazing temperature cycle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A brazing fixture for holding an ODS alloy workpiece having a joint to be brazed and a top surface and a bottom surface, the fixture comprising:

an ODS alloy bottom section having a first surface formed to substantially mirror first design dimensions of said bottom surface and a first brazing cavity half extending into said bottom section from said first surface; and an ODS alloy top section having a second surface formed to substantially mirror second design dimensions of said top surface and a second brazing cavity half extending into said top section from said second surface;

wherein said bottom section mates to said top section with said first surface facing said second surface such that said workpiece will be constrained to said first and second design dimensions when said workpiece is positioned between said first and second surfaces; and wherein said first and second brazing cavity halves form a brazing cavity around said joint when said bottom section mates with said top section.

2. The brazing fixture of claim 1, wherein said ODS alloy comprises MA 754.

3. The brazing fixture of claim 1, wherein said workpiece comprises a turbine vane.

4. The brazing fixture of claim 1, wherein said workpiece includes a hollow cavity formed therein and said fixture further comprises:

an ODS alloy center section having an exterior surface formed to substantially mirror at least a portion of said hollow cavity;

wherein said center section is positioned within said hollow cavity when said workpiece is positioned between said first and second surfaces.

5. The brazing fixture of claim 4, wherein said ODS alloy center section comprises MA 754.

6. The brazing fixture of claim 1, further comprising:

a first plurality of channels formed in said first surface; and a second plurality of channels formed in said second surface;

wherein said bottom section does not contact said bottom surface at said first plurality of channels; and wherein said top section does not contact said to surface at said second plurality of channels;

whereby a thermal lag of said workpiece during a thermal cycle is reduced.

7. The brazing fixture of claim 1, further comprising:

a passageway formed through said top section and intersecting said second surface; and a thermocouple extending through said passageway and contacting said workpiece.

8. The brazing fixture of claim 1, further comprising:

a passageway formed through said top section and intersecting said second brazing cavity half; and a thermocouple extending through said passageway and contacting said workpiece.

* * * * *

UNITED STATES PATENT AND TRADEMARK OFFICE
CERTIFICATE OF CORRECTION

PATENT NO : 6,129,257
DATED : October 10, 2000
INVENTORS : Raymond R. Xu, Stephen N. Hammond and Richard P. Chesnes It is certified that error appears in the above-identified patent and that said Letters Patent are hereby corrected as shown below:

In col. 6, line 1, please change "to" to --top.--

Signed and Sealed this

Twenty-second Day of May, 2001

*Attest:*

NICHOLAS P. GODICI

*Attesting Officer*     *Acting Director of the United States Patent and Trademark Office*